No. 813,337. PATENTED FEB. 20, 1906.
F. WEATHERS.
BRIDLE BIT AND ATTACHING MEANS THEREFOR.
APPLICATION FILED MAY 19, 1905.
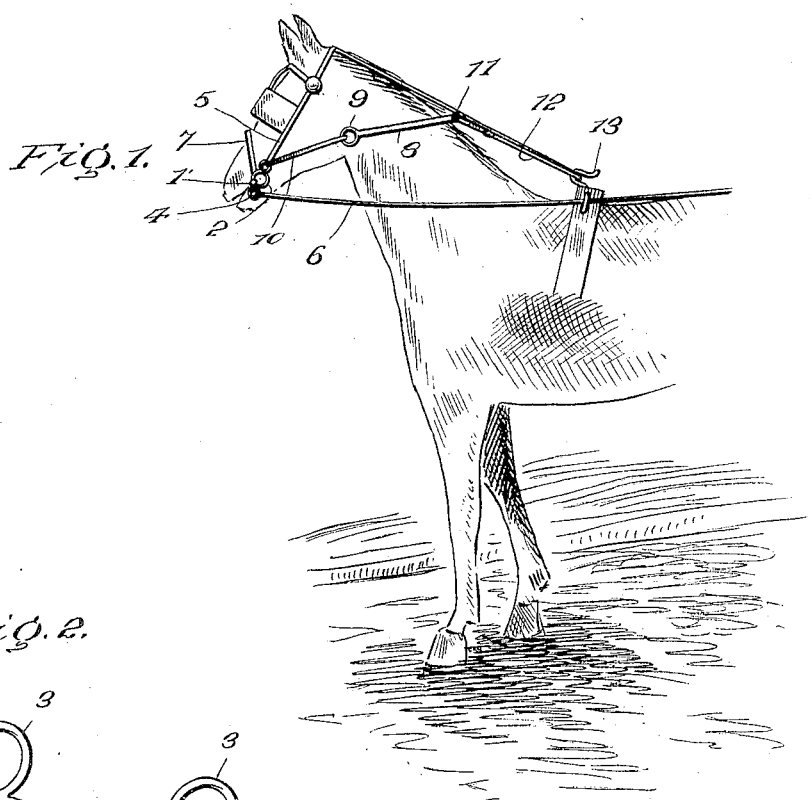
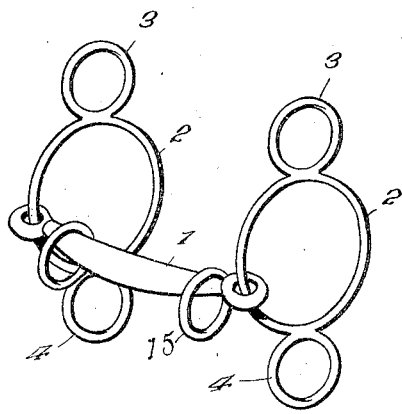
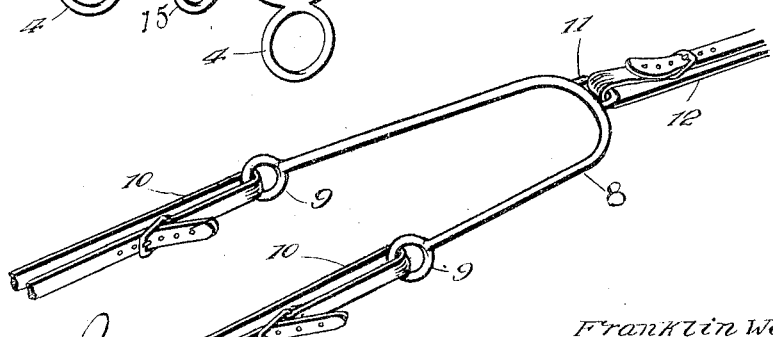
Inventor
Franklin Weathers,

UNITED STATES PATENT OFFICE.

FRANKLIN WEATHERS, OF FINDLAY, ILLINOIS.

BRIDLE-BIT AND ATTACHING MEANS THEREFOR.

No. 813,337.  Specification of Letters Patent.  Patented Feb. 20, 1906.

Application filed May 19, 1905. Serial No. 261,238.

*To all whom it may concern:*

Be it known that I, FRANKLIN WEATHERS, a citizen of the United States, residing at Findlay, in the county of Shelby and State of Illinois, have invented certain new and useful Improvements in Bridle-Bits and Attaching Means Therefor, of which the following is a specification.

This invention consists of a peculiar form of bridle-bit for horses and in attaching means therefor designed to be applied to vicious and intractable animals for controlling the same and preventing them from kicking in harness.

For a full description of the invention and the merits thereof and also to acquire a knowledge of the details of construction of the means for effecting the result reference is to be had to the following description and accompanying drawings, in which—

Figure 1 is a side elevation showing the invention applied to a horse. Fig. 2 is a perspective view of the mouthpiece and strap-connecting members carried thereby. Fig. 3 is a detail perspective view of the yoke for the animal's neck and the strap connections for connecting the same with the mouthpiece of the bit and with the harness.

Corresponding and like parts are referred to in the following description and indicated in all the views of the drawings by the same reference characters.

The device embodying the invention comprises, primarily, the mouthpiece 1, which is of a form at present commonly in use, said mouthpiece having at its ends the attaching members or strap-connecting rings 2. The rings 2 are each formed with upper and lower loops 3 and 4, respectively, the upper loops 3 being adapted to admit of connection of the cheek-straps 5 with the bit, the reins 6 being directly connected with the lower loops 4. An overcheck-rein 7 may be used, and this strap is directly connected at its ends with the mouthpiece 1 by means of rings 15.

As an antikicking means for use in connection with the bit before described it is designed to use the rigid neckpiece 8, which is virtually a yoke adapted to fit about the neck of the animal from the back, the sides of the yoke being formed with loops 9, connected by straps 10 with the uppermost loops 3 of the rings 2. The yoke 8 is of somewhat U form, and the rear portion of said yoke is formed with a loop 11, adapted to receive a strap 12, which will connect the yoke with a check-hook 13 of the harness. From the foregoing it will be noted that the driver may obtain a great deal of leverage upon the bit-piece 1 in controlling the animal, and the use of the yoke 8 is such as to obviate all likelihood of the animal kicking while in harness. The straps 10 and 12 are of course adjustable, so as to cause the yoke 8 to hold the animal's head more rigid, as found necessary under actual conditions of service. When the reins 6 are pulled upon, the loops 3 are of course forced forwardly, creating a tension upon the straps 10, which causes the yoke 8 to bind harder against the neck of the animal, and the yoke is therefore also advantageous as a device coöperating with the bit to facilitate proper control of the animal. The connections 10 and 12 are likewise adapted to hold the head of the animal from forward movement, except as limited thereby.

The rings 15, by which the overcheck 7 is connected with the mouthpiece 1, are loosely mounted upon the mouthpiece, as shown most clearly in Fig. 2 of the drawings.

Having thus described the invention, what is claimed as new is—

1. In combination, a bit comprising a mouthpiece, attaching members at the ends of the bit, reins connected with the lower portion of the attaching members, and a yoke to embrace the neck of the animal connected with the upper portion of the attaching members.

2. In combination, a bit comprising a mouthpiece, attaching members at the ends of the bit, reins connected with the lower portion of the attaching members, a yoke to embrace the neck of the animal connecting with the upper portion of the attaching members, and a check-strap connected with the rear portion of the yoke.

3. In combination, a bit comprising a mouthpiece, rings at the end portions of the mouthpiece, loops extended from the upper and lower portions of the rings aforesaid, reins connected with the lower loops of the rings, a rigid yoke to receive the neck of the animal connected with the upper loops of the rings, and a check-strap connected with the rear portion of the yoke.

4. In combination, a bit comprising a mouthpiece, a rigid yoke adapted to receive the neck of the animal, connections between the yoke and the mouthpiece, and means for connecting the yoke with the harness.

5. In combination, harness embodying a check-hook, a bit comprising a mouthpiece, a yoke adapted to receive the neck of the animal, connections between the sides of the yoke and opposite ends of the mouthpiece, and connecting means between the said yoke and the check-hook.

6. In combination, harness embodying a check-hook, a bit comprising a mouthpiece, a yoke adapted to receive the neck of an animal, adjustable connections between the sides of the yoke and opposite ends of the mouthpiece, and adjustable connecting means between said yoke and the check-hook.

In testimony whereof I affix my signature in presence of two witnesses.

FRANKLIN WEATHERS.

Witnesses:
   PETER W. BLOSS,
   R. D. MINER